Sept. 8, 1925.  A. PETERSEN  1,552,754
MEAT PRESS
Filed June 29, 1923
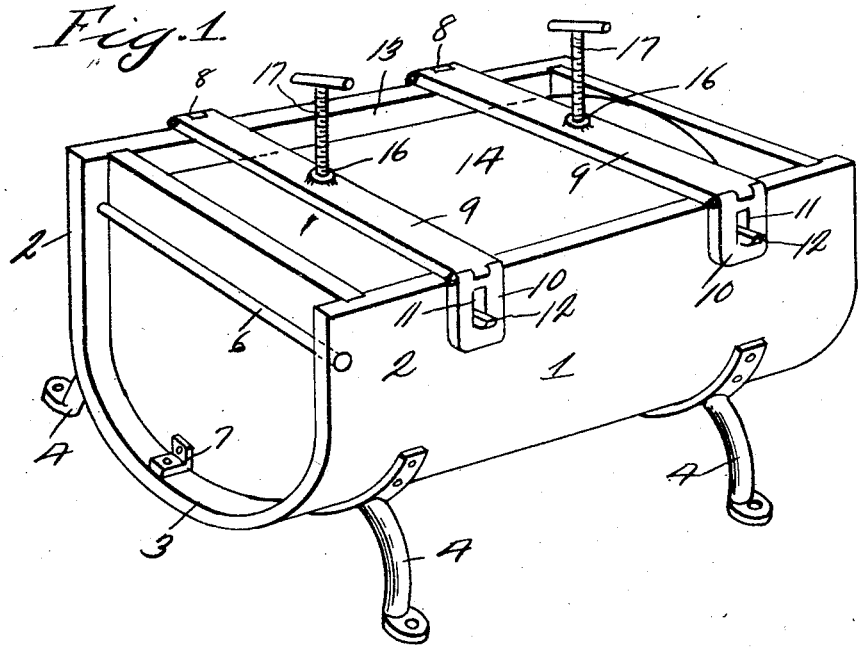
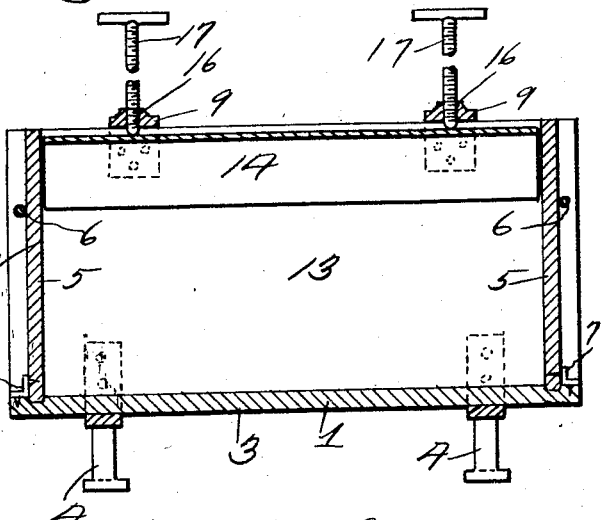
Inventor
Armand Petersen
By Philip A. Sorell
Attorney Patented Sept. 8, 1925.

1,552,754

UNITED STATES PATENT OFFICE.

ARMAND PETERSEN, OF OMAHA, NEBRASKA.

MEAT PRESS.

Application filed June 29, 1923. Serial No. 648,415.

*To all whom it may concern:*

Be it known that ARMAND PETERSEN, a citizen of the United States, residing at Omaha, in the county of Douglas and State of Nebraska, has invented certain new and useful Improvements in Meat Presses, of which the following is a specification, reference being had therein to the accompanying drawings.

The invention relates to meat presses and has for its object to provide a device of this character wherein meat may be compressed to different densities quickly and preferably into a cylindrical shape.

A further object is to provide a meat press comprising a receptacle, the bottom of which is concaved, and a concaved compressing element disposed within the receptacle, and forced downwardly by means of set screws carried by hingedly mounted transversely disposed bars. The compressing member is preferably formed from flexible steel and has its longitudinal edges sharpened, thereby insuring the cutting of the meat adjacent its opposite sides during a compressing operation, and the flexibility of the concaved member allows the same to conform or spring inwardly at its longitudinal side when it engages the inner inclined wall of the receptacle for further insuring a compressing operation.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the meat press.

Figure 2 is a vertical longitudinal sectional view through the meat press.

Figure 3 is a vertical transverse sectional view through the meat press.

Referring to the drawing, the numeral 1 designates a receptacle, the walls 2 of which are vertically disposed and in parallel relation, and the bottom 3 convexed. The device may be formed from metal or any other material and is preferably supported on legs 4, which may be secured to a floor, if so desired. The end walls 5 of the receptacle are vertically disposed and are held in place by means of transversely disposed bolts 6 and angled brackets 7, therefore it will be seen that the receptacle may be easily and quickly assembled or disassembled if desired. Hingedly connected at 8 to the upper side of one of the walls 2 are transversely disposed bars 9, which bars extend across the upper side of the receptacle and are provided with hinged sections 10 in apertures 11 of which lugs 12 are received, for rigidly holding said bars in horizontal position and in a manner whereby they may be easily unfastened and moved out of positions above the receptacle, thereby allowing meat to be placed within the chamber 13 of the receptacle.

Disposed within the receptacle 1 is an elongated concaved plate 14, which plate is preferably formed from flexible material whereby it may flex longitudinally when said plate is forced downwardly into the chamber 13, and its sharpened edges 15 into engagement with the inner wall of the curved bottom 3 of the device, thereby compressing the meat 15$^a$ into the desired density. The sharpened edges 15 also sever the meat from the sides thereof during the downward movement of the plate 14, thereby insuring a smooth compact cylinder of compressed meat. Threaded at 16 through the bars 9 are hand operated screws 17, which screws engage the upper side of the concaved plate 14, when said plate is forced downwardly.

From the above it will be seen that a meat press is provided whereby meat may be compressed to the desired density, and one which is hand operated, and one wherein a concaved plate is used as a compressing element, which compressing element also severs the meat at the sides of the meat during a compressing operation.

The invention having been set forth what is claimed as new and useful is:—

A meat press comprising a receptacle, the opposite walls of said receptacle being in parallel relation, the bottom of said receptacle being concaved, transversely disposed bars hingedly connected to the upper side of the receptacle, a longitudinally disposed concaved compressing plate formed from flexible material and disposed within the receptacle, the opposite edges of said plate being sharpened and disposed adjacent opposite sides of the receptacle and set screws carried by said transversely disposed bars and adapted to engage the convexed side of the concaved plate, the sharpened edges of said compressing plate being flexed outwardly into close scraping engagement with the opposite walls of the receptacle during a meat compressing operation.

In testimony whereof I hereunto affix my signature.

ARMAND PETERSEN.